US012741623B2

(12) United States Patent
Kosuge

(10) Patent No.: US 12,741,623 B2
(45) Date of Patent: Sep. 22, 2026

(54) CONTROLLER AND CONTROL METHOD

(71) Applicant: Robert Bosch GmbH, Stuttgart (DE)

(72) Inventor: Takuma Kosuge, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 18/625,403

(22) Filed: Apr. 3, 2024

(65) Prior Publication Data

US 2024/0343236 A1 Oct. 17, 2024

(30) Foreign Application Priority Data

Apr. 11, 2023 (JP) ................................ 2023-064491

(51) Int. Cl.
*B60T 8/58* (2006.01)
*B60T 8/172* (2006.01)

(52) U.S. Cl.
CPC ................ *B60T 8/58* (2013.01); *B60T 8/172* (2013.01); *B60T 2220/04* (2013.01); *B60T 2250/04* (2013.01)

(58) Field of Classification Search
CPC ........ B60T 8/58; B60T 8/172; B60T 2220/04; B60T 2250/04
USPC ........................................................... 701/70
See application file for complete search history.

(56) References Cited

U.S. PATENT DOCUMENTS 5,413,541 A * 5/1995 Nasset ................ F16H 61/0213 477/81
6,095,002 A * 8/2000 Tuson .................. B60W 30/18 477/118
6,625,535 B2 * 9/2003 Han ........................ B60T 8/245 701/65
7,225,073 B2 * 5/2007 Hedman ............. B60K 31/047 180/170
7,668,636 B2 * 2/2010 Hayashikawa ......... B60T 8/885 701/76
7,934,589 B2 * 5/2011 Groner .................... B60T 7/122 701/70
9,500,155 B2 * 11/2016 Matsunaga ............. B60T 7/042
11,273,809 B2 * 3/2022 Ono .................... B60T 8/17616
12,139,122 B2 * 11/2024 Matsuzaki .............. B60T 8/172
2001/0016795 A1 * 8/2001 Bellinger ............ B60W 10/196 701/53

(Continued)

FOREIGN PATENT DOCUMENTS

JP 2010052519 A 3/2010

*Primary Examiner* — Kurt Philip Liethen
*Assistant Examiner* — John D Bailey
(74) *Attorney, Agent, or Firm* — Michael Best & Friedrich LLP

(57) ABSTRACT

A controller that controls behavior of a vehicle, and includes a control section that controls deceleration of the vehicle. In a situation where the vehicle is being decelerated, when a shift position of the vehicle is switched from a first position, at which power can be transmitted between a drive source (for example, an engine and a travel motor) of the vehicle and a drive wheel of the vehicle, to a second position, at which the power cannot be transmitted between the drive source and the drive wheel in an unlocked state of the drive wheel, the control section executes automatic deceleration control for automatically increasing the deceleration of the vehicle with respect to deceleration depending on a brake operation by the driver of the vehicle.

11 Claims, 2 Drawing Sheets

(56) References Cited

U.S. PATENT DOCUMENTS

2003/0168266 A1* 9/2003 Sasaki .................. B60W 10/18
903/918
2005/0125134 A1* 6/2005 Iwatsuki .............. B60T 8/1755
701/54
2005/0125137 A1* 6/2005 Shiiba ............ B60W 30/18109
340/436
2005/0187694 A1* 8/2005 Shiiba ............ B60W 30/18109
701/91
2005/0218718 A1* 10/2005 Iwatsuki .............. B60T 8/1766
303/177
2005/0267665 A1* 12/2005 Iwatsuki ......... B60W 30/18136
701/70
2007/0164607 A1* 7/2007 Itoh ...................... B60T 8/4872
303/155
2008/0269998 A1* 10/2008 Shiiba .................... B60W 10/11
701/70
2013/0035817 A1* 2/2013 Bahar ................. B60K 7/0007
701/22
2013/0211686 A1* 8/2013 Shono .................... G06F 17/00
701/70
2016/0251003 A1* 9/2016 Weihl ........................ B60T 7/12
701/70
2021/0197866 A1* 7/2021 Ikenori .................... B60Q 9/00
2021/0276521 A1* 9/2021 Ota ..................... B60T 8/17636
2022/0176924 A1* 6/2022 Matsuzaki .............. B60T 8/172
2022/0185246 A1* 6/2022 Szuck .................... G06N 20/00
2023/0311883 A1* 10/2023 Yamada ................. B60K 6/547
701/70
2023/0373449 A1* 11/2023 Onishi ................. B60T 8/1766

* cited by examiner

CONTROLLER AND CONTROL METHOD

BACKGROUND

The present invention relates to a controller and a control method.

As an example of a device for controlling deceleration of a vehicle by controlling a braking force generated to a wheel, a hydraulic pressure control unit is provided to the vehicle. For example, as disclosed in JP2010-052519A, a plurality of valves and a pump are installed to a channel inside the hydraulic pressure control unit, and the deceleration of the vehicle is controlled by controlling operation of each of the valves and the pump.

By the way, the braking force generated in relation to a drive source, such as engine braking or regenerative braking by a travel motor, is also exerted on the traveling vehicle. The vehicle has the following shift positions: a first position (for example, a D-range) at which power can be transmitted between the drive source and a drive wheel; and a second position (for example, an N-range) at which the power cannot be transmitted between the drive source and the drive wheel in an unlocked state of the drive wheel. Here, there is a case where the shift position of the traveling vehicle is switched from the first position to the second position due to an erroneous operation or an intentional operation by a driver. When the shift position of the traveling vehicle is switched from the first position to the second position, just as described, exertion of the braking force generated in relation to the drive source is suddenly stopped, and the driver possibly feels uneasy due to a significant change in the deceleration of the vehicle.

SUMMARY

The invention has been made in view of such a problem and therefore has a purpose of providing a controller and a control method capable of suppressing a driver from feeling uneasy.

In order to solve the above problem, a controller is a controller that controls behavior of a vehicle, and includes a control section that controls deceleration of the vehicle. In a situation where the vehicle is being decelerated, when a shift position of the vehicle is switched from a first position, at which power can be transmitted between a drive source of the vehicle and a drive wheel of the vehicle, to a second position, at which the power cannot be transmitted between the drive source and the drive wheel in an unlocked state of the drive wheel, the control section executes automatic deceleration control for automatically increasing the deceleration of the vehicle with respect to deceleration depending on a brake operation by a driver of the vehicle.

In order to solve the above problem, a control method is a control method for controlling behavior of a vehicle, and includes controlling deceleration of the vehicle by a control section of a controller. In a situation where the vehicle is being decelerated, when a shift position of the vehicle is switched from a first position, at which power can be transmitted between a drive source of the vehicle and a drive wheel of the vehicle, to a second position, at which the power cannot be transmitted between the drive source and the drive wheel in an unlocked state of the drive wheel, the control section executes automatic deceleration control for automatically increasing the deceleration of the vehicle with respect to deceleration depending on a brake operation by a driver of the vehicle.

According to the invention, it is possible to suppress the driver from feeling uneasy.

DETAILED DESCRIPTION

A detailed description will hereinafter be made on a preferred embodiment of the invention with reference to the accompanying drawings. Dimensions, materials, other specific numerical values, and the like described in such an embodiment are merely illustrative to facilitate understanding of the invention, and do not limit the invention unless otherwise specifically stated. In the present specification and the drawings, elements having substantially the same function and configuration will be denoted by the same reference sign, and an overlapping description will not be made. In addition, elements that are not directly related to the invention will not be illustrated.

<Configuration of Vehicle>

A description will be made on a configuration of a vehicle 1 according to the embodiment of the invention with reference to FIGS. 1 to 3.

Figure 1:
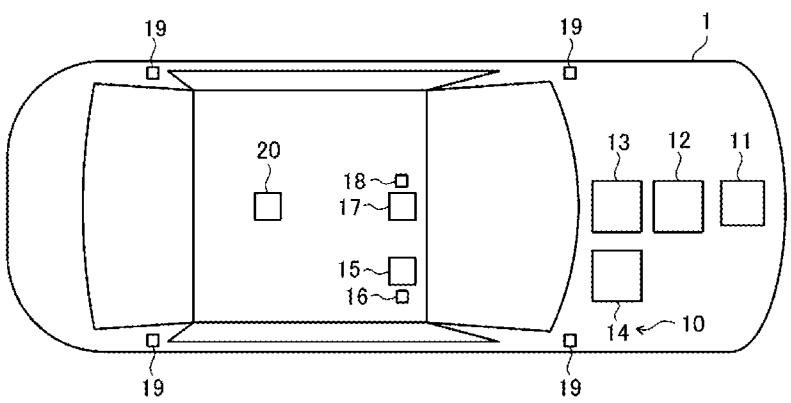
FIG. 1 is a schematic view illustrating an outline configuration of a vehicle according to an embodiment of the invention.

FIG. 1 is a schematic view illustrating an outline configuration of the vehicle 1. As illustrated in FIG. 1, the vehicle 1 includes an engine 11, a travel motor 12, a power transmission mechanism 13, a hydraulic pressure control unit 14, a brake pedal 15, a brake sensor 16, a shift change device 17, a shift position sensor 18, a wheel rotational frequency sensor 19, and a controller 20.

The vehicle 1 is a hybrid vehicle that includes the engine 11 and the travel motor 12 as drive sources, and corresponds to an example of the vehicle according to the invention. However, the vehicle according to the invention is not limited to the example below. For example, the vehicle according to the invention may be an engine vehicle that only includes the engine 11 as the drive source, or may be an electric vehicle that only includes the travel motor 12 as the drive source.

The engine 11 uses fuel such as gasoline to generate and output power. The power output from the engine 11 is transmitted to a drive wheel of the vehicle 1 via the power transmission mechanism 13.

The travel motor 12 uses electric power stored in a battery to generate and output the power. The power output from the travel motor 12 is transmitted to the drive wheel of the vehicle 1 via the power transmission mechanism 13.

The power transmission mechanism 13 transmits the power output from the drive sources (that is, the engine 11 and the travel motor 12) to the drive wheel. The power transmission mechanism 13 includes devices such as a transmission and a clutch. By using these devices, the power transmission mechanism 13 can change a rotational frequency and a rotational direction of the power to be transmitted to the drive wheel. In addition, the power transmission mechanism 13 can be switched between a state capable of transmitting the power between the drive source and the drive wheel and a state incapable of transmitting the power between the drive source and the drive wheel.

The hydraulic pressure control unit 14 is a unit that has a function to control a braking force generated to the vehicle 1. The hydraulic pressure control unit 14 controls the braking force generated to the vehicle 1 by controlling the braking force generated to each of the wheels. A brake system 10 including the hydraulic pressure control unit 14 will be described in detail below.

The brake pedal 15 is used for a brake operation by a driver. In the brake operation, the driver depresses the brake pedal 15. As will be described below, the hydraulic pressure control unit 14 basically generates, to each of the wheels, the braking force that corresponds to an operation amount of the brake pedal 15 by the driver.

The brake sensor 16 detects the operation amount of the brake pedal 15 by the driver. In the case where an electric booster that supplements the brake operation force by the driver is not provided, presence or absence of the brake operation can be determined on the basis of a detection result by a sensor that detects a pressure in a master cylinder 32, which will be described below. Thus, in such a case, the brake sensor 16 can be eliminated.

The shift change device 17 is a device for switching a shift position of the vehicle 1. The driver of the vehicle 1 can switch the shift position by performing an operation using a shift lever that is provided to the shift change device 17, for example.

The shift position of the vehicle 1 can be selected from a D-range, an R-range, an N-range, and a P-range, for example. In the D-range, with an accelerator operation by the driver, the power in a direction to cause forward travel of the vehicle 1 is transmitted to the drive wheel. In the R-range, with the accelerator operation by the driver, the power in a direction to cause reverse travel of the vehicle 1 is transmitted to the drive wheel. In the N-range and P-range, the power is not transmitted to the drive wheel. While the drive wheel is not locked in the N-range, the drive wheel is locked in the P-range.

The D-range and the R-range each correspond to an example of the first position at which the power can be transmitted between the drive source and the drive wheel. The N-range corresponds to an example of the second position at which the power cannot be transmitted between the drive source and the drive wheel in an unlocked state of the drive wheel. Here, the term of the first position, at which the power in the direction to cause the forward travel of the vehicle 1 is transmitted to the drive wheel, may be other than the D-range. In addition, the term of the first position, at which the power in the direction to cause the reverse travel of the vehicle 1 is transmitted to the drive wheel, may be other than the R-range. Furthermore, the term of the second position may be other than the N-range.

The shift position sensor 18 detects the shift position of the vehicle 1.

The wheel rotational frequency sensor 19 is provided to each of the wheels and detects a rotational frequency of each wheel.

The controller 20 includes: a central processing unit (CPU) as an arithmetic processing unit; read only memory (ROM) as a storage element for storing a program, an arithmetic parameter, and the like used by the CPU; random access memory (RAM) as a storage element for temporarily storing a parameter and the like that are appropriately changed by running of the CPU; and the like. The controller 20 may be provided as one unit or may be divided into multiple units, for example. When the controller 20 is divided into the multiple units, various functions, which will be described below, are distributed to the multiple units. Thus, for example, some functions of a control section 22, which will be described below, and some other functions thereof may be distributed to the separate units.

Figure 2:
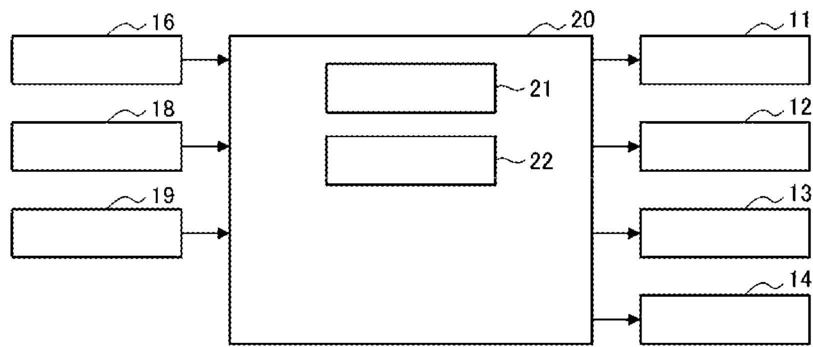
FIG. 2 is a block diagram illustrating an example of a functional configuration of a controller according to the embodiment of the invention.
Figure 3:
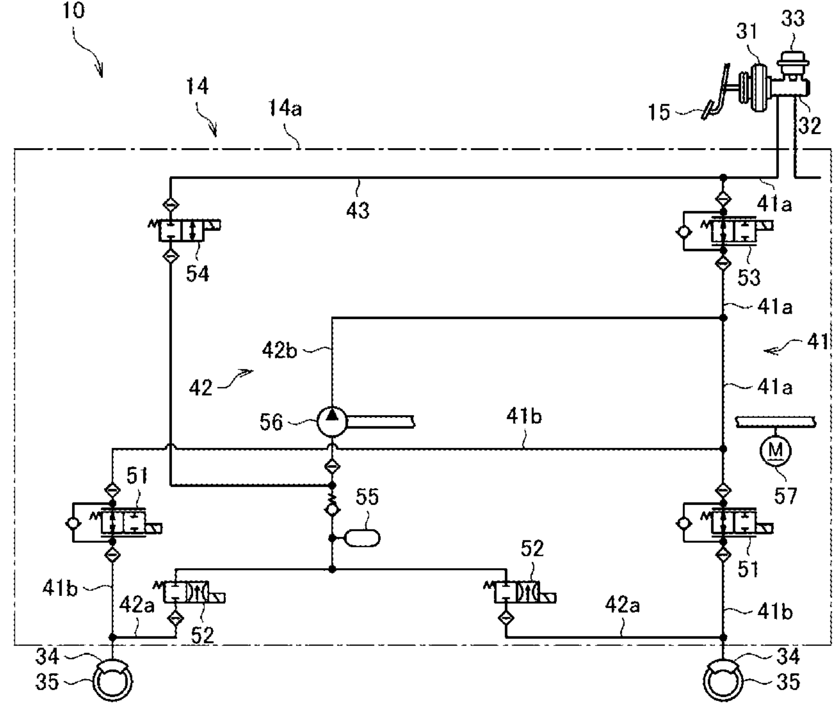
FIG. 3 is a schematic view illustrating an outline configuration of a brake system according to the embodiment of the invention.

FIG. 2 is a block diagram illustrating an example of a functional configuration of the controller 20. As illustrated in FIG. 2, the controller 20 includes an acquisition section 21 and the control section 22, for example.

The acquisition section 21 acquires information from each of the devices in the vehicle 1. For example, the acquisition section 21 acquires information from the brake sensor 16, the shift position sensor 18, and the wheel rotational frequency sensor 19. In the case where the sensor is provided to detect the pressure in the master cylinder 32, which will be described below, the acquisition section 21 can also acquire information from such a sensor. In the present specification, acquisition of the information can include extraction, generation (for example, calculation), and the like of the information.

The control section 22 controls operation of each of the devices in the vehicle 1. For example, the control section 22 controls operation of the engine 11, the travel motor 12, the power transmission mechanism 13, and the hydraulic pressure control unit 14. For example, the control section 22 controls the operation of the engine 11 and the travel motor 12 on the basis of an operation amount of the accelerator operation by the driver. In addition, for example, the control section 22 controls engagement/disengagement operation of each of the clutches in the power transmission mechanism 13 on the basis of the shift position of the vehicle 1.

Here, a description will be made on an outline configuration of the brake system 10 in the vehicle 1 with reference to FIG. 3. FIG. 3 is a schematic view illustrating the outline configuration of the brake system 10. As illustrated in FIG. 3, the brake system 10 includes the hydraulic pressure control unit 14, the brake pedal 15, a booster 31, the master cylinder 32, a reservoir 33, a brake device 34, and a wheel 35.

The vehicle 1 includes the four wheels 35, and each of the wheels 35 is braked by the brake device 34 that is provided to each wheel 35. The braking force generated to each of the wheels 35 is controlled by the hydraulic pressure control unit 14. In order to facilitate understanding, FIG. 3 only illustrates a portion of the brake system 10 associated with one of a front wheel and a rear wheel, and a portion of the brake system 10 associated with the other of the front wheel and the rear wheel is not illustrated. The number of the wheels 35 of the vehicle 1 may be other than four.

The booster 31 is connected to the brake pedal 15 and boosts a depression force on the brake pedal 15. The master cylinder 32 is connected to the booster 31, includes a piston, which reciprocates in an interlocking manner with the brake pedal 15, therein, and generates a hydraulic pressure that corresponds to an operation amount of the brake operation. The reservoir 33 is attached to the master cylinder 32 and stores a brake fluid.

The hydraulic pressure control unit 14 includes a base body 14_a_ that is formed with a brake fluid channel. The master cylinder 32 and each of the brake devices 34 are connected to the base body 14_a_ of the hydraulic pressure control unit 14. The brake fluid channel in the base body 14*a* of the hydraulic pressure control unit 14 is connected to a wheel cylinder of the brake device 34. The braking force that corresponds to a hydraulic pressure of the brake fluid in the wheel cylinder of the brake device 34 is generated to the wheel 35.

The base body 14*a* of the hydraulic pressure control unit 14 is formed with a primary channel 41, a secondary channel 42, and a supply channel 43 as the brake fluid channels. The brake fluid in the master cylinder 32 is distributed to the wheel cylinder of the brake device 34 through the primary channel 41. The brake fluid in the wheel cylinder of the brake device 34 is released through the secondary channel 42. The brake fluid in the master cylinder 32 is supplied to the secondary channel 42 through the supply channel 43.

The base body 14*a* of the hydraulic pressure control unit 14 also includes an inlet valve (EV) 51, an outlet valve (AV) 52, a first valve (USV) 53, a second valve (HSV) 54, an accumulator 55, a pump 56, and a motor 57 as components for controlling the braking force generated to each of the wheels 35.

The primary channel 41 communicates between the master cylinder 32 and the wheel cylinder of the brake device 34. The primary channel 41 includes a first primary channel 41*a* and two second primary channels 41*b*. The first primary channel 41*a* is connected to the master cylinder 32. Each of the two second primary channels 41*b* is branched from the first primary channel 41*a* and connected to each brake device 34. The first valve 53 is provided to the first primary channel 41*a*. The inlet valve 51 is provided to each of the second primary channels 41*b*.

The secondary channel 42 communicates between a portion of the primary channel 41 on the brake device 34 side from the inlet valve 51 and a portion of the primary channel 41 on the master cylinder 32 side from the inlet valve 51 and on the brake device 34 side from the first valve 53. The secondary channel 42 includes two first secondary channels 42*a* and a second secondary channel 42*b*. Each of the first secondary channels 42*a* is connected to the portion of the primary channel 41 on the brake device 34 side from the inlet valve 51. The second secondary channel 42*b* connects between a merging point of the two first secondary channels 42*a* and the portion of the primary channel 41 on the master cylinder 32 side from the inlet valve 51 and on the brake device 34 side from the first valve 53. The outlet valve 52 is provided to each of the first secondary channels 42*a*. The second secondary channel 42*b* is provided with the accumulator 55 and the pump 56 in this order from the first secondary channel 42*a* side.

The pump 56 is driven by the motor 57 to suction the brake fluid from the first secondary channel 42*a* side and discharge the brake fluid to the primary channel 41 side. The pump 56 is a reciprocating plunger pump, for example. A plunger of the pump 56 reciprocates when being pressed intermittently by an eccentric cam that is provided to an output shaft of the motor 57. In this way, the pump 56 pressure-feeds the brake fluid.

The supply channel 43 communicates between a portion of the primary channel 41 on the master cylinder 32 side from the first valve 53 and a portion of the secondary channel 42 on a suction side of the pump 56. The supply channel 43 is provided with the second valve 54.

The inlet valve 51 is an electromagnetic valve that is opened in an unenergized state and is closed in an energized state, for example. The outlet valve 52 is an electromagnetic valve that is closed in the unenergized state and is opened in the energized state, for example. The first valve 53 is an electromagnetic valve that is opened in the unenergized state and is closed in the energized state, for example. The second valve 54 is an electromagnetic valve that is closed in the unenergized state and is opened in the energized state, for example. The braking force that is generated to each of the wheels 35 is controlled when the operation of these valves and the motor 57 is controlled.

During normal time (more specifically, when the braking force that corresponds to the brake operation by the rider is set to be generated to the wheel 35), the control section 22 opens the inlet valve 51, closes the outlet valve 52, opens the first valve 53, and closes the second valve 54. In this way, the brake fluid flows from the master cylinder 32 into the wheel cylinder of the brake device 34 not via the secondary channel 42 and the supply channel 43 but only via the primary channel 41. When the brake pedal 15 is depressed in such a state, a piston in the master cylinder 32 is pressed to increase the hydraulic pressure of the brake fluid in the wheel cylinder, and the braking force is then applied to the wheel 35.

<Operation of Controller>

A description will be made on operation of the controller 20 according to the embodiment of the invention with reference to FIGS. 4 and 5.

As described above, the vehicle 1 includes the engine 11 and the travel motor 12 as the drive sources. In addition to the braking force by the hydraulic pressure control unit 14, the braking force by engine braking and the braking force by regenerative braking are also exerted on the traveling vehicle 1. The engine braking is a phenomenon in which the braking force is exerted on the vehicle 1 due to revolution of the engine 11 caused by the drive wheel. The regenerative braking is a phenomenon in which the braking force is exerted on the vehicle 1 due to electric power generation by the travel motor 12 using kinetic energy of the wheels. The electric power generated by the travel motor 12 is supplied to the battery and charges the battery.

Here, there is a case where the shift position of the traveling vehicle 1 is switched from the first position (for example, the D-range) to the second position (for example, the N-range) due to an erroneous operation or an intentional operation by the driver. When the shift position of the traveling vehicle 1 is switched from the first position to the second position, just as described, the power can no longer be transmitted between the drive source and the drive wheel, and the exertion of the braking forces generated in relation to the drive sources (more specifically, the braking force by the engine braking and the braking force by the regenerative braking) is suddenly stopped. As a result, a significant change possibly occurs to the deceleration of the vehicle 1, and the driver possibly feels uneasy. To handle such a problem, in this embodiment, the control section 22 can execute automatic deceleration control in order to suppress the driver from feeling uneasy. As will be described below, the automatic deceleration control is control for automatically increasing the deceleration of the vehicle 1 with respect to the deceleration depending on the brake operation by the driver of the vehicle 1.

Figure 4:
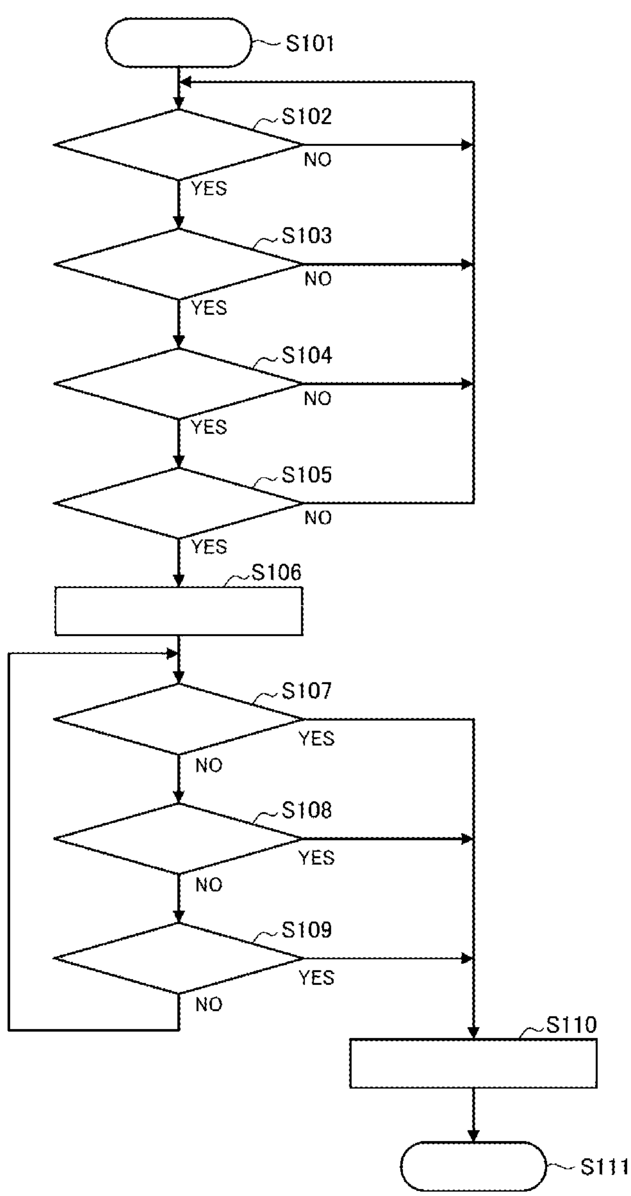
FIG. 4 is a flowchart illustrating an example of a processing procedure that is executed by the controller according to the embodiment of the invention.

FIG. 4 is a flowchart illustrating an example of a processing procedure that is executed by the controller 20. Step S101 in FIG. 4 corresponds to initiation of a control flow illustrated in FIG. 4. Step S111 in FIG. 4 corresponds to termination of the control flow illustrated in FIG. 4. The control flow illustrated in FIG. 4 is initiated when the automatic deceleration control is not executed and the shift position of the vehicle 1 is the first position. The control flow illustrated in FIG. 4 is initiated again in the case where the shift position of the vehicle 1 is the first position after the termination of the control flow, for example.

When the control flow illustrated in FIG. 4 is initiated, in step S102, the control section 22 determines whether the vehicle 1 is being decelerated. For example, the control section 22 can determine whether the vehicle 1 is being decelerated on the basis of history of a speed of the vehicle 1, which is acquired on the basis of a detection result by the wheel rotational frequency sensor 19.

If it is determined that the vehicle 1 is not being decelerated (step S102/NO), the processing in step S102 is repeated. On the other hand, if it is determined that the vehicle 1 is being decelerated (step S102/YES), the processing proceeds to step S103.

If it is determined YES in step S102, in step S103, the control section 22 determines whether the shift position of the vehicle 1 has been switched from the first position to the second position. For example, the control section 22 can determine whether the shift position of the vehicle 1 has been switched from the first position to the second position on the basis of a detection result by the shift position sensor 18.

If it is not determined that the shift position of the vehicle 1 has been switched from the first position to the second position (step S103/NO), the processing returns to step S102. On the other hand, if it is determined that the shift position of the vehicle 1 has been switched from the first position to the second position (step S103/YES), the processing proceeds to step S104.

If it is determined YES in step S103, in step S104, the control section 22 determines whether the brake operation by the driver of the vehicle 1 is being performed. For example, the control section 22 can determine whether the brake operation by the driver is being performed on the basis of a detection result by the brake sensor 16. Here, the control section 22 may determine whether the brake operation by the driver is being performed on the basis of a detection result by the sensor that detects the pressure in the master cylinder 32 instead of the brake sensor 16.

If it is determined that the brake operation by the driver is not being performed (step S104/NO), the processing returns to step S102. On the other hand, if it is determined that the brake operation by the driver is being performed (step S104/YES), the processing proceeds to step S105.

If it is determined YES in step S104, in step S105, the control section 22 determines whether the speed of the vehicle 1 is higher than a reference speed. For example, the control section 22 can determine whether the speed of the vehicle 1 is higher than the reference speed on the basis of the speed of the vehicle 1, which is acquired on the basis of the detection result by the wheel rotational frequency sensor 19.

The reference speed in step S105 is set to a speed with which it is possible to appropriately determine whether it is currently in a situation where switching between the D-range and the R-range is performed via the N-range (such as a situation where the vehicle 1 is about to be parked in a parking lot), for example. A case where the speed of the vehicle 1 is lower than the reference speed corresponds to a case of the situation where the vehicle 1 is about to be parked in the parking lot, or the like.

If it is determined that the speed of the vehicle 1 is lower than the reference speed (step S105/NO), the processing returns to step S102. On the other hand, if it is determined that the speed of the vehicle 1 is higher than the reference speed (step S105/YES), the processing proceeds to step S106.

If it is determined YES in step S105, in step S106, the control section 22 executes the automatic deceleration control. As described above, the automatic deceleration control is the control for automatically increasing the deceleration of the vehicle 1 with respect to the deceleration depending on the brake operation by the driver of the vehicle 1. The deceleration depending on the brake operation by the driver is the deceleration generated by the hydraulic pressure control unit 14 during the normal time in which the automatic deceleration control is not executed, and such deceleration corresponds to the deceleration in accordance with the operation amount of the brake operation by the driver.

Figure 5:
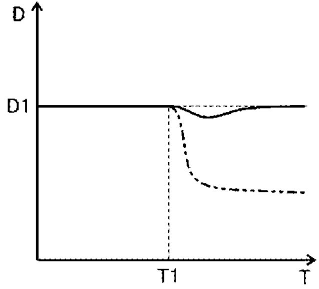
FIG. 5 is a graph indicating an exemplary transition of deceleration of the vehicle according to the embodiment of the invention.

FIG. 5 is a graph indicating an exemplary transition of deceleration D of the vehicle 1. FIG. 5 has a horizontal axis representing a time point T and indicates the transition of the deceleration D of the vehicle 1. In the example of FIG. 5, before a time point T1, the vehicle 1 is decelerated at constant deceleration D1. Here, before the time point T1, the shift position of the vehicle 1 is the D-range. Then, at the time point T1, the automatic deceleration control is executed in conjunction with switching of the shift position of the vehicle 1 from the D-range to the N-range.

In FIG. 5, the transition of the deceleration D in a case where the automatic deceleration control is not executed at the time point T1 is indicated by a two-dot chain line. In the case where the automatic deceleration control is not executed at the time point T1, at the time point T1, the exertion of the braking forces generated in relation to the drive sources (more specifically, the braking force by the engine braking and the braking force by the regenerative braking) is suddenly stopped in conjunction with switching of the shift position of the vehicle 1 from the D-range to the N-range. As a result, such a state is maintained where the hydraulic pressure control unit 14 generates the braking force corresponding to the operation amount of the brake operation by the driver. However, as indicated by the two-dot chain line, the deceleration D of the vehicle 1 is significantly reduced, and the driver possibly feels uneasy. Meanwhile, in this embodiment, the automatic deceleration control is executed at the time point T1 as described above. Hereinafter, as an example of the case where the electric booster is not provided, or the like, a description will be made on an example in which the automatic deceleration control is executed by using the supply channel 43. However, when the electric booster is provided, as will be described below, the automatic deceleration control is preferably executed by using the electric booster from perspectives of noise suppression and vibration suppression.

When the automatic deceleration control is initiated, the control section 22 opens the inlet valve 51, closes the outlet valve 52, closes the first valve 53, and opens the second valve 54, for example. As a result, the brake fluid flows from the master cylinder 32 into the wheel cylinder of the brake device 34 via the supply channel 43 and the secondary channel 42. In such a state, the control section 22 runs the motor 57 to drive the pump 56. Consequently, the hydraulic pressure of the brake fluid in the wheel cylinder of the brake device 34 is increased, the braking force exerted on the wheel 35 is thus increased, and the deceleration D of the vehicle 1 is automatically increased with respect to the deceleration D depending on the brake operation by the driver (for example, the deceleration D indicated by the two-dot chain line in FIG. 5).

Here, in the automatic deceleration control, the control section 22 controls the deceleration D of the vehicle 1 in a manner to approach the target deceleration D1, which is the deceleration D at the time when the shift position is switched from the first position to the second position. Just as described, the deceleration D1 will also be referred to as the target deceleration D1 below. For example, when the shift position is switched from the first position to the second position, the deceleration D at the time is stored in the storage element of the controller 20, and the control section 22 can refer to the deceleration D. However, timing at which the shift position is switched from the first position to the second position does not strictly match the time point T1 at which the shift position is switched from the first position to the second position, and may be a time point that is slightly shifted from the time point T1.

For example, the control section 22 executes feedback control (for example, PID control) such that the deceleration D as a control amount approaches the target deceleration D1 as a target value. As a result, as indicated by a solid line in FIG. 5, at the time point T1 onward, the deceleration D of the vehicle 1 is maintained near the target deceleration D1. Thus, at the time point T1 onward, a significant reduction in the deceleration D of the vehicle 1 is suppressed, and the driver is suppressed from feeling uneasy. In the case where the deceleration D exceeds the target deceleration D1 after the initiation of the automatic deceleration control due to an increase in the operation amount of the brake operation by the driver, requested deceleration by the driver is prioritized, and the deceleration D is not automatically increased or reduced. In the case where the deceleration D falls below the target deceleration D1 again due to the reduction in the operation amount of the brake operation by the driver, the deceleration D is automatically increased such that the deceleration D approaches the target deceleration D1.

From a perspective of suppressing the excess increase in the deceleration D, which is caused by signal abnormality or the like in the brake system 10 (that is, occurrence of sudden braking), in the automatic deceleration control, the control section 22 preferably controls the deceleration D of the vehicle 1 to be equal to or lower than upper limit deceleration. The upper limit deceleration is set to such a magnitude that the deceleration D is not excessively restricted while occurrence of the sudden braking is suppressed, for example.

A change rate of the deceleration D in the automatic deceleration control is preferably set to a rate that does not give the driver a great sense of uneasiness, for example. Thus, the control section 22 preferably controls the change rate of the deceleration D generated to the vehicle 1 by the automatic deceleration control to a change rate that is set in advance not to give the driver the great sense of uneasiness.

The above description has been made on the example in which, in the automatic deceleration control, the hydraulic pressure of the brake fluid in the wheel cylinder of the brake device 34 is increased by using the supply channel 43. However, the automatic deceleration control may be executed by using the electric booster that supplements the brake operation force by the driver. For example, in the automatic deceleration control, the control section 22 may increase the hydraulic pressure of the brake fluid in the wheel cylinder of the brake device 34 by increasing the hydraulic pressure of the brake fluid in the master cylinder 32 with the electric booster.

After step S106 in FIG. 4, in step S107, the control section 22 determines whether the brake operation by the driver of the vehicle 1 has been canceled. For example, the control section 22 can determine whether the brake operation by the driver has been canceled on the basis of the detection result by the sensor that detects the pressure in the master cylinder 32. Here, the control section 22 may determine whether the brake operation by the driver has been canceled on the basis of the detection result by the brake sensor 16.

If it is determined that the brake operation by the driver has not been canceled (step S107/NO), the processing proceeds to step S108. On the other hand, if it is determined that the brake operation by the driver has been canceled (step S107/YES), the processing proceeds to step S110. In step S110, the control section 22 terminates the automatic deceleration control, and the control flow illustrated in FIG. 4 is terminated.

If it is determined NO in step S107, in step S108, the control section 22 determines whether the vehicle 1 has been stopped. For example, the control section 22 can determine whether the vehicle 1 has been stopped on the basis of the speed of the vehicle 1, which is acquired on the basis of the detection result by the wheel rotational frequency sensor 19. The control section 22 determines that the vehicle 1 has been stopped when the speed of the vehicle 1 becomes lower than a speed that is slightly higher than 0 km/h, for example.

If it is determined that the vehicle 1 has not been stopped (step S108/NO), the processing proceeds to step S109. On the other hand, if it is determined that the vehicle 1 has been stopped (step S108/YES), the processing proceeds to step S110. In step S110, the control section 22 terminates the automatic deceleration control, and the control flow illustrated in FIG. 4 is terminated.

If it is determined NO in step S108, in step S109, the control section 22 determines whether the shift position of the vehicle 1 has been switched from the second position to the first position. For example, the control section 22 can determine whether the shift position of the vehicle 1 has been switched from the second position to the first position on the basis of the detection result by the shift position sensor 18.

If it is determined that the shift position of the vehicle 1 has not been switched from the second position to the first position (step S109/NO), the processing returns to step S107. On the other hand, if it is determined that the shift position of the vehicle 1 has been switched from the second position to the first position (step S109/YES), the processing proceeds to step S110. In step S110, the control section 22 terminates the automatic deceleration control, and the control flow illustrated in FIG. 4 is terminated.

The above description has been made on the processing example that is executed by the controller 20 with reference to FIG. 4. However, the processing executed by the controller 20 may be processing in which modifications are added to the processing example described above.

For example, in the example of FIG. 4, the execution condition of the automatic deceleration control includes: the condition that the vehicle 1 is being decelerated (step S102/YES); the condition that the shift position of the vehicle 1 has been switched from the first position to the second position (step S103/YES); the condition that the brake operation by the driver is being performed (step S104/YES); and the condition that the speed of the vehicle 1 is higher than the reference speed (step S105/YES). Then, when all of the above conditions are satisfied, the automatic deceleration control is executed. However, the automatic deceleration control may be executed when at least the condition that the vehicle 1 is being decelerated (step S102/YES) and the condition that the shift position of the vehicle 1 has been switched from the first position to the second position (step S103/YES) are satisfied. That is, one of step S104 and step S105 or both of step S104 and step S105 may be eliminated from the flowchart in FIG. 4.

In the case where step S104 is eliminated from the flowchart in FIG. 4, the automatic deceleration control may be executed in a situation where the driver is not performing the brake operation. In this case, the deceleration D depending on the brake operation by the driver corresponds to the deceleration D in a situation where the braking force by the hydraulic pressure control unit 14 is not generated. Thus, in the automatic deceleration control, the control section 22 automatically increases the deceleration D of the vehicle 1 by automatically generating the braking force by the hydraulic pressure control unit 14. Also, in this case, as described above, in the case where the deceleration D exceeds the target deceleration D1 after the initiation of the automatic deceleration control due to the increase in the operation amount of the brake operation by the driver, the deceleration D is not automatically increased or reduced.

For example, in the example of FIG. 4, in regard to the termination condition of the automatic deceleration control, when any one of the condition that the brake operation by the driver has been canceled (step S107/YES), the condition that the vehicle 1 has been stopped (step S108/YES), and the condition that the shift position of the vehicle 1 has been switched from the second position to the first position (step S109/YES) is satisfied, the automatic deceleration control is terminated. However, the processing in any of step S107, step S108, and step S109 may be eliminated from the flowchart in FIG. 4. Alternatively, the processing in all of step S107, step S108, and step S109 may be eliminated from the flowchart in FIG. 4, and another termination condition (for example, a condition that the driver has performed a particular operation, or the like) may be employed.

<Effects of Controller>

A description will be made on effects of the controller 20 according to the embodiment of the invention.

The controller 20 includes the control section 22 that controls the deceleration D of the vehicle 1. In the situation where the vehicle 1 is being decelerated, when the shift position of the vehicle 1 is switched from the first position (the D-range or the R-range in the above example), at which the power can be transmitted between the drive source of the vehicle 1 and the drive wheel of the vehicle 1, to the second position (the N-range in the above example), at which the power cannot be transmitted between the drive source and the drive wheel in the unlocked state of the wheel, the control section 22 executes the automatic deceleration control for automatically increasing the deceleration D of the vehicle 1 with respect to the deceleration D depending on the brake operation by the driver of the vehicle 1. As a result, at the time point, at which the shift position of the vehicle 1 is switched from the first position to the second position (the time point T1 in the example of FIG. 5), onward, it is possible to suppress the significant reduction in the deceleration D of the vehicle 1 and thus to suppress the driver from feeling uneasy.

In particular, the above effect of suppressing the driver from feeling uneasy is further effective for the vehicle 1 that is the hybrid vehicle including the engine 11 and the travel motor 12 as the drive sources as in the above example. For example, the braking force generated in relation to the drive source is larger in the hybrid vehicle than in the engine vehicle by the amount of the braking force exerted by the regenerative braking. Thus, when the shift position is switched from the first position to the second position, the exertion of the large braking force generated in relation to the drive source is suddenly stopped. For this reason, the above effect (that is, the effect exerted by the automatic deceleration control) of suppressing the driver from feeling uneasy is particularly effective for the hybrid vehicle when the shift position is switched from the first position to the second position.

Preferably, in the automatic deceleration control, the control section 22 of the controller 20 controls the deceleration D of the vehicle 1 in the manner to approach the target deceleration (the deceleration D1 in the example of FIG. 5), which is the deceleration D at the time when the shift position is switched from the first position to the second position. As a result, at the time point, at which the shift position of the vehicle 1 is switched from the first position to the second position (the time point T1 in the example of FIG. 5), onward, it is possible to further effectively reduce a change amount of the deceleration D of the vehicle 1 and thus to further effectively suppress the driver from feeling uneasy.

In particular, even in the case where a gradient of a travel road of the vehicle 1 is changed significantly before and after the time point at which the shift position of the vehicle 1 is switched from the first position to the second position, the change amount of the deceleration D of the vehicle 1 can further effectively be suppressed. For example, in the case where the travel road before switching of the shift position from the first position to the second position is a flat road, and the travel road after switching of the shift position from the first position to the second position is a downhill road, the sufficient magnitude of the deceleration D can be exerted on the vehicle 1 that travels on the downhill road after the shift change. In addition, for example, in the case where the travel road before switching of the shift position from the first position to the second position is the downhill road, and the travel road after switching of the shift position from the first position to the second position is the flat road, it is possible to suppress the excess increase in the deceleration D of the vehicle 1 that travels on the flat road after the shift change.

However, the control method for the deceleration D by the control section 22 in the automatic deceleration control is not limited to the above example. For example, in the automatic deceleration control, the control section 22 may control the deceleration D of the vehicle 1 in the manner to approach different target deceleration from that in the above example. Such target deceleration may be less or greater than the deceleration D at the time when the shift position is switched from the first position to the second position, for example. Furthermore, for example, in the automatic deceleration control, the control section 22 may control the deceleration D of the vehicle 1 to be greater by a predetermined value with respect to the deceleration D depending on the brake operation by the driver, or may control the deceleration D of the vehicle 1 to be a value multiplied by a predetermined multiplying factor with respect to the deceleration D depending on the brake operation by the driver.

Preferably, in the automatic deceleration control, the control section 22 of the controller 20 controls the deceleration D of the vehicle 1 to be less than the upper limit deceleration. In this way, it is possible to suppress the excess increase in the deceleration D caused by the signal abnormality or the like in the brake system 10 (that is, the occurrence of the sudden braking).

Preferably, in the case where the shift position is switched from the first position to the second position in the situation where the vehicle 1 is being decelerated, the control section 22 of the controller 20 executes the automatic deceleration control when the brake operation is performed. In this way, as long as the driver has the intention to decelerate the vehicle 1, the automatic deceleration control can be executed. Thus, by executing the automatic deceleration control, it is possible to suppress the significant deceleration D from being generated to the vehicle 1 against the driver's intention.

Preferably, in the case where the shift position is switched from the first position to the second position in the situation where the vehicle 1 is being decelerated, the control section 22 of the controller 20 executes the automatic deceleration control when the speed of the vehicle 1 is higher than the reference speed. In this way, it is possible to suppress unnecessary execution of the automatic deceleration control at the time when the shift position is set to the N-range due to switching between the D-range and the R-range in the situation where the vehicle 1 is about to be parked in the parking lot, or the like.

Preferably, the control section 22 of the controller 20 terminates the automatic deceleration control in the case where the brake operation is canceled during the execution of the automatic deceleration control. In this way, the automatic deceleration control can be terminated when the driver has the intention to terminate the deceleration of the vehicle 1. Thus, it is possible to suppress the unnecessary execution of the automatic deceleration control in such a case.

Preferably, the control section 22 of the controller 20 terminates the automatic deceleration control in the case where the vehicle 1 is stopped during the execution of the automatic deceleration control. In this way, it is possible to suppress such a situation where the automatic deceleration control is unnecessarily executed and thus the large braking force is unnecessarily generated to the vehicle 1 when the vehicle 1 is stopped.

Preferably, the control section 22 of the controller 20 terminates the automatic deceleration control in the case where the shift position is switched from the second position to the first position during the execution of the automatic deceleration control. In this way, the shift position is switched from the second position to the first position, and the automatic deceleration control can be terminated with recovery of the braking force caused by the drive source.

The description has been made so far on the preferred embodiment of the invention with reference to the accompanying drawings. However, it is needless to say that the invention is not limited to the above-described embodiment and that various modification examples and correction examples falling within the scope described in the claims also belong to the technical scope of the invention.

For example, the processing that has been described in the present specification by using the flowchart may not necessarily be executed in the order illustrated in the flowchart. Some of the processing steps may be executed in parallel. In addition, an additional processing step may be employed, and some of the processing steps may not be provided.

For example, a series of the processing by the controller 20 described above may be realized by using any of software, hardware, and a combination of the software and the hardware. The program constituting the software is stored in advance in a storage medium that is provided inside or outside an information processor, for example.

What is claimed is:

1. A controller (20) that controls behavior of a vehicle (1), the controller comprising:

a control section (22) that controls deceleration (D) of the vehicle (1), wherein in a situation where the vehicle (1) is being decelerated by a brake operation performed by a driver of the vehicle (1), a shift position of the vehicle (1) is switched from a first position, at which power can be transmitted between a drive source (11, 12) of the vehicle (1) and a drive wheel of the vehicle (1), to a second position, at which the power cannot be transmitted between the drive source (11, 12), and the drive wheel is in an unlocked state, the control section (22) executes automatic deceleration control for automatically increasing the deceleration (D) of the vehicle (1) to continue the brake operation performed by the driver after the shift position is switched from the first position to the second position.

2. The controller according to claim 1, wherein in the automatic deceleration control, the control section (22) controls the deceleration (D) of the vehicle (1) in a manner to approach target deceleration (D1) that is deceleration (D) at the time when the shift position is switched from the first position to the second position.

3. The controller according to claim 1, wherein in the automatic deceleration control, the control section (22) controls the deceleration (D) of the vehicle (1) to be equal to or lower than upper limit deceleration.

4. The controller according to claim 1, wherein in the situation where the vehicle (1) is being decelerated, when the shift position is switched from the first position to the second position and the brake operation is being performed, the control section (22) executes the automatic deceleration control.

5. The controller according to claim 1, wherein in the situation where the vehicle (1) is being decelerated, when the shift position is switched from the first position to the second position and a speed of the vehicle (1) is higher than a reference speed, the control section (22) executes the automatic deceleration control.

6. The controller according to claim 1, wherein the control section (22) determines when the brake operation by the driver is canceled during execution of the automatic deceleration control based on information from a brake sensor (16) and terminates the automatic deceleration control.

7. The controller according to claim 1, wherein the control section (22) terminates the automatic deceleration control when the vehicle (1) is stopped.

8. The controller according to claim 1, wherein when the shift position is switched from the second position to the first position during execution of the automatic deceleration control, the control section (22) terminates the automatic deceleration control.

9. The controller of claim 1, wherein the deceleration depending on the brake operation by the driver is a deceleration generated by a hydraulic pressure control unit (14) in response to an operation amount of a brake by the driver of the vehicle (1) detected by a brake sensor (16).

10. A control method for controlling behavior of a vehicle (1), the control method comprising:

controlling deceleration (D) of the vehicle (1) by a control section (22) of a controller (20), wherein in a situation where the vehicle (1) is being decelerated by a brake operation performed by a driver of the vehicle (1), a shift position of the vehicle (1) is switched from a first position, at which power can be transmitted between a drive source (11, 12) of the vehicle (1) and a drive wheel of the vehicle (1), to a second position, at which the power cannot be transmitted between the drive source (11, 12), and the drive wheel in an unlocked state, the control section (22) executes automatic deceleration control for automatically increasing the deceleration (D) of the vehicle (1) to continue the brake operation performed by the driver after the shift position is switched from the first position to the second position.

11. A controller (20) that controls behavior of a vehicle (1), the controller comprising:

a control section (22) that controls deceleration (D) of the vehicle (1), wherein in a situation where the vehicle (1) is being decelerated by a brake operation performed by a driver of the vehicle (1), a transmission shift position of the vehicle (1) is switched from a first position, at which power can be transmitted between a drive source (11, 12) of the vehicle (1) and a drive wheel of the vehicle (1), to a second position, at which the power cannot be transmitted between the drive source (11, 12), and the drive wheel in an unlocked state, the control section (22) executes automatic deceleration control for automatically increasing the deceleration (D) of the vehicle (1) to continue the brake operation performed by the driver after the shift position is switched from the first position to the second position.

* * * * *